US008632399B2

(12) United States Patent
Peterson

(10) Patent No.: US 8,632,399 B2
(45) **Date of Patent: *Jan. 21, 2014**

(54) GAMING SYSTEM HAVING A COMMON DISPLAY, A FIRST BONUS GAME OR A FIRST BONUS GAME PAYTABLE AND AN OPTION TO PURCHASE A SECOND BONUS GAME OR A SECOND BONUS GAME PAYTABLE WITH RELATIVELY EXPECTED HIGHER VALUES

(71) Applicant: IGT, Reno, NV (US)

(72) Inventor: Lance R. Peterson, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/745,492

(22) Filed: Jan. 18, 2013

(65) Prior Publication Data

US 2013/0143648 A1 Jun. 6, 2013

Related U.S. Application Data

(63) Continuation of application No. 12/769,278, filed on Apr. 28, 2010, now Pat. No. 8,371,938, which is a continuation of application No. 11/224,444, filed on Sep. 12, 2005, now Pat. No. 7,727,068.

(51) Int. Cl.
*A63F 9/24* (2006.01)
*A63F 13/00* (2006.01)

(52) U.S. Cl.
USPC .................. 463/29; 463/16; 463/20; 463/31; 463/42

(58) Field of Classification Search
USPC ...................................................... 463/30–31
See application file for complete search history.

(56) References Cited

U.S. PATENT DOCUMENTS 3,628,259 A 12/1971 Kahn
4,156,976 A 6/1979 Mikun (Continued)

FOREIGN PATENT DOCUMENTS

AU 200245837 12/2002
AU 771847 4/2004

(Continued)

OTHER PUBLICATIONS

"A Salute to Game Shows," The Price is Right—Pricing Games, printed from schuminweb.com/game-shows/shows/price-is-right/pricing-games.htm on Mar. 16, 2001.

(Continued)

*Primary Examiner* — Steven J Hylinski
(74) *Attorney, Agent, or Firm* — Neal, Gerber & Eisenberg LLP

(57) ABSTRACT

A gaming system including a plurality of gaming devices and a shared or a common secondary display associated with the gaming devices. In one embodiment, the shared display is adjacent to one or more of the gaming devices of the gaming system. The gaming system includes at least one primary game and at least one secondary or bonus game. The bonus game is associated with a plurality of average expected payouts or values. In one embodiment, the bonus game that is played on the secondary display is associated with a higher average expected payout or higher values than the average expected payouts or values of the bonus game played on the individual gaming devices. When the player places a designated wager, they qualify to play the game on the secondary display and thus qualify for a chance to win the higher awards.

28 Claims, 9 Drawing Sheets

(56) References Cited

U.S. PATENT DOCUMENTS 4,448,419 A 5/1984 Telnaes
4,570,934 A 2/1986 Smyth
4,621,814 A 11/1986 Stepan et al.
4,669,731 A 6/1987 Clarke
4,695,053 A 9/1987 Vazquez, Jr. et al.
4,743,022 A 5/1988 Wood
4,805,907 A 2/1989 Hagiwara
4,838,552 A 6/1989 Hagiwara
4,991,848 A 2/1991 Greenwood et al.
5,011,159 A 4/1991 Fortunato et al.
5,019,973 A 5/1991 Wilcox et al.
5,088,737 A 2/1992 Frank et al.
5,100,137 A 3/1992 Fulton
5,116,055 A 5/1992 Tracy
5,167,413 A 12/1992 Fulton
5,224,706 A 7/1993 Bridgeman et al.
5,248,142 A 9/1993 Breeding
5,294,120 A 3/1994 Schultz
5,294,128 A 3/1994 Marquez
5,342,047 A 8/1994 Heidel et al.
5,344,144 A 9/1994 Canon
5,375,830 A 12/1994 Takemoto et al.
5,377,973 A 1/1995 Jones et al.
5,393,057 A 2/1995 Marnell, II
5,393,067 A 2/1995 Paulsen et al.
5,397,125 A 3/1995 Adams
5,401,023 A 3/1995 Wood
5,489,101 A 2/1996 Moody
5,511,781 A 4/1996 Wood et al.
5,531,448 A 7/1996 Moody
5,542,669 A 8/1996 Charron et al.
5,564,700 A 10/1996 Celona
5,570,885 A 11/1996 Ornstein
5,580,055 A 12/1996 Hagiwara
5,584,486 A 12/1996 Franklin
5,584,764 A 12/1996 Inoue
5,593,161 A 1/1997 Boylan et al.
5,611,535 A 3/1997 Tiberio
5,645,485 A 7/1997 Clapper, Jr.
5,657,993 A 8/1997 Merlino et al.
5,678,001 A 10/1997 Nagel et al.
5,707,285 A 1/1998 Place et al.
5,711,715 A 1/1998 Ringo et al.
5,718,431 A 2/1998 Ornstein
D392,340 S 3/1998 DeSimone
5,722,891 A 3/1998 Inoue
5,732,950 A 3/1998 Moody
5,766,074 A 6/1998 Cannon et al.
5,769,716 A 6/1998 Saffari et al.
5,772,509 A 6/1998 Weiss
5,775,692 A 7/1998 Watts et al.
5,788,573 A 8/1998 Baerlocher et al.
5,788,574 A 8/1998 Ornstein et al.
5,791,987 A 8/1998 Chen et al.
5,807,172 A 9/1998 Piechowiak
5,816,916 A 10/1998 Moody
5,816,918 A 10/1998 Kelly et al.
5,817,172 A 10/1998 Yamada et al.
5,823,873 A 10/1998 Moody
5,823,874 A 10/1998 Adams
5,839,730 A 11/1998 Pike
5,848,932 A 12/1998 Adams
5,868,619 A 2/1999 Wood et al.
5,882,105 A 3/1999 Barlow
5,882,258 A 3/1999 Kelly et al.
5,902,184 A 5/1999 Bennett
5,910,048 A 6/1999 Feinberg
5,911,418 A 6/1999 Adams
5,934,672 A 8/1999 Sines et al.
5,947,820 A 9/1999 Morro et al.
5,951,397 A 9/1999 Dickinson
5,954,335 A 9/1999 Moody
5,967,893 A 10/1999 Lawrence et al.
D416,054 S 11/1999 McGahn et al.
5,976,016 A 11/1999 Moody et al.
5,980,384 A 11/1999 Barrie
5,984,310 A 11/1999 English
5,984,781 A 11/1999 Sunaga
5,993,316 A 11/1999 Coyle et al.
5,997,401 A 12/1999 Crawford
6,004,207 A 12/1999 Wilson, Jr. et al.
6,007,066 A 12/1999 Moody
6,007,424 A 12/1999 Evers et al.
6,012,720 A 1/2000 Webb
6,012,981 A 1/2000 Fujioka et al.
6,012,983 A 1/2000 Walker et al.
6,032,955 A 3/2000 Luciano et al.
6,056,642 A 5/2000 Bennett
6,059,289 A 5/2000 Vancura
6,062,980 A 5/2000 Luciano
6,062,981 A 5/2000 Luciano, Jr.
6,068,553 A 5/2000 Parker
6,071,192 A 6/2000 Weiss
6,077,162 A 6/2000 Weiss
6,077,163 A 6/2000 Walker et al.
6,089,977 A 7/2000 Bennett
6,089,978 A 7/2000 Adams
6,089,980 A 7/2000 Gauselmann
6,093,102 A 7/2000 Bennett
6,098,985 A 8/2000 Moody
6,102,400 A 8/2000 Scott et al.
6,102,402 A 8/2000 Scott et al.
6,105,962 A 8/2000 Malavazos et al.
6,110,041 A 8/2000 Walker et al.
6,113,098 A 9/2000 Adams
6,120,378 A 9/2000 Moody et al.
6,126,165 A 10/2000 Sakamoto
6,126,541 A 10/2000 Fuchs
6,126,542 A 10/2000 Fier
6,129,632 A 10/2000 Luciano
6,135,884 A 10/2000 Hedrick et al.
6,142,872 A 11/2000 Walker et al.
6,142,874 A 11/2000 Kodachi et al.
6,149,521 A 11/2000 Sanduski
6,155,925 A 12/2000 Giobbi et al.
6,158,741 A 12/2000 Koelling
6,159,095 A 12/2000 Frohm et al.
6,159,097 A 12/2000 Gura
6,159,098 A 12/2000 Slomiany et al.
6,162,121 A 12/2000 Morro et al.
6,168,520 B1 1/2001 Baerlocher et al.
6,168,522 B1 1/2001 Walker et al.
6,168,523 B1 1/2001 Piechowiak et al.
6,174,233 B1 1/2001 Sunaga et al.
6,186,894 B1 2/2001 Mayeroff
6,190,255 B1 2/2001 Thomas et al.
6,193,606 B1 2/2001 Walker et al.
6,196,547 B1 3/2001 Pascal et al.
6,203,429 B1 3/2001 Demar et al.
6,210,277 B1 4/2001 Stefan
6,217,022 B1 4/2001 Asteneha
6,217,448 B1 * 4/2001 Olsen .............................. 463/25
6,224,482 B1 5/2001 Bennett
6,224,483 B1 5/2001 Mayeroff
6,224,484 B1 5/2001 Okuda et al.
6,227,969 B1 5/2001 Yoseloff
6,227,971 B1 5/2001 Weiss
6,231,442 B1 5/2001 Mayeroff
6,231,445 B1 5/2001 Acres
6,234,897 B1 5/2001 Frohm et al.
6,238,287 B1 5/2001 Komori et al.
6,244,957 B1 6/2001 Walker et al.
6,254,482 B1 7/2001 Walker et al.
6,270,409 B1 8/2001 Shuster
6,290,603 B1 9/2001 Luciano, Jr.
6,299,165 B1 10/2001 Nagano
6,302,790 B1 10/2001 Brossard
6,302,791 B1 10/2001 Frohm et al.
6,309,299 B1 10/2001 Weiss
6,312,331 B1 11/2001 Tamaki
6,312,334 B1 11/2001 Yoseloff
6,315,662 B1 11/2001 Jorasch et al.
6,328,649 B1 12/2001 Randall et al.
6,336,862 B1 1/2002 Byrne

(56) References Cited

U.S. PATENT DOCUMENTS

| | | | |
|---|---|---|---|
| 6,358,147 | B1 | 3/2002 | Jaffe et al. |
| 6,364,314 | B1 | 4/2002 | Canterbury |
| 6,368,214 | B1 | 4/2002 | Luciano |
| 6,375,569 | B1 | 4/2002 | Acres |
| 6,394,902 | B1 | 5/2002 | Glavich et al. |
| 6,398,218 | B1 | 6/2002 | Vancura |
| 6,425,823 | B1 | 7/2002 | Byrne |
| 6,428,412 | B1 | 8/2002 | Anderson et al. |
| 6,439,995 | B1 | 8/2002 | Hughs-Baird et al. |
| 6,443,456 | B1 | 9/2002 | Gajor |
| 6,450,884 | B1 | 9/2002 | Seelig et al. |
| 6,468,156 | B1 | 10/2002 | Hughs-Baird et al. |
| 6,491,584 | B2 | 12/2002 | Graham et al. |
| 6,517,073 | B1 | 2/2003 | Vancura |
| 6,540,614 | B1 | 4/2003 | Nishino et al. |
| 6,569,013 | B1 | 5/2003 | Taylor |
| 6,569,018 | B2 | 5/2003 | Jaffe |
| 6,592,457 | B1 | 7/2003 | Frohm et al. |
| 6,599,193 | B2 | 7/2003 | Baerlocher et al. |
| 6,607,195 | B2 | 8/2003 | Vancura |
| 6,609,969 | B1 | 8/2003 | Luciano et al. |
| 6,609,970 | B1 | 8/2003 | Luciano, Jr. |
| 6,612,927 | B1 | 9/2003 | Slomiany et al. |
| 6,634,942 | B2 | 10/2003 | Walker et al. |
| 6,656,046 | B1 * | 12/2003 | Yoseloff et al. ................. 463/20 |
| 6,656,048 | B2 * | 12/2003 | Olsen .............................. 463/25 |
| 6,682,073 | B2 | 1/2004 | Bryant et al. |
| 6,692,003 | B2 | 2/2004 | Potter et al. |
| 6,695,696 | B1 | 2/2004 | Kaminkow |
| 6,702,289 | B1 | 3/2004 | Feola |
| 6,712,693 | B1 | 3/2004 | Hetlinger |
| 6,712,695 | B2 | 3/2004 | Mothwurf et al. |
| 6,726,563 | B1 | 4/2004 | Baerlocher et al. |
| 6,739,970 | B2 | 5/2004 | Luciano |
| 6,746,016 | B2 | 6/2004 | Perrie et al. |
| 6,758,473 | B2 | 7/2004 | Seelig et al. |
| 6,758,749 | B2 | 7/2004 | Krintzman |
| 6,764,396 | B2 | 7/2004 | Seelig et al. |
| 6,786,824 | B2 | 9/2004 | Cannon |
| 6,802,778 | B1 | 10/2004 | Lemay et al. |
| 6,857,957 | B2 | 2/2005 | Marks et al. |
| 6,884,167 | B2 | 4/2005 | Walker et al. |
| 6,916,243 | B2 | 7/2005 | Yoshida |
| 6,923,720 | B2 | 8/2005 | Loose |
| 6,923,722 | B2 | 8/2005 | Yamada et al. |
| 6,960,136 | B2 | 11/2005 | Joshi et al. |
| 7,008,324 | B1 | 3/2006 | Johnson et al. |
| 7,029,395 | B1 | 4/2006 | Baerlocher |
| 7,052,395 | B2 | 5/2006 | Glavich et al. |
| 7,121,943 | B2 | 10/2006 | Webb et al. |
| 7,291,068 | B2 | 11/2007 | Bryant et al. |
| 7,311,598 | B2 | 12/2007 | Kaminkow et al. |
| 7,318,774 | B2 | 1/2008 | Bryant et al. |
| 7,329,179 | B2 | 2/2008 | Baerlocher |
| 7,347,777 | B2 | 3/2008 | Gauselmann |
| 7,357,714 | B2 | 4/2008 | Tessmer et al. |
| 7,390,260 | B2 | 6/2008 | Englman |
| 7,419,429 | B2 | 9/2008 | Taylor |
| 7,445,547 | B2 | 11/2008 | Suzuki |
| 7,771,266 | B2 | 8/2010 | Gerrard et al. |
| 7,985,128 | B2 | 7/2011 | Fong |
| 2001/0018361 | A1 | 8/2001 | Acres |
| 2001/0038178 | A1 | 11/2001 | Vancura |
| 2002/0086725 | A1 | 7/2002 | Fasbender et al. |
| 2002/0137559 | A1 | 9/2002 | Baerlocher |
| 2002/0187827 | A1 | 12/2002 | Blankstein |
| 2003/0054873 | A1 | 3/2003 | Peterson |
| 2003/0060266 | A1 | 3/2003 | Baerlocher |
| 2003/0060269 | A1 | 3/2003 | Paulsen et al. |
| 2003/0060281 | A1 | 3/2003 | Vancura |
| 2003/0069063 | A1 | 4/2003 | Bilyeu et al. |
| 2003/0092480 | A1 | 5/2003 | White et al. |
| 2003/0092490 | A1 | 5/2003 | Gauselmann |
| 2003/0153383 | A1 | 8/2003 | Baerlocher et al. |
| 2003/0195031 | A1 | 10/2003 | O'Donovan et al. |
| 2003/0207713 | A1 | 11/2003 | Taylor |
| 2004/0017043 | A1 | 1/2004 | Moody |
| 2004/0023713 | A1 | 2/2004 | Wolf et al. |
| 2004/0048657 | A1 | 3/2004 | Gauselmann |
| 2004/0116175 | A1 | 6/2004 | Aida |
| 2004/0162129 | A1 | 8/2004 | Nelson |
| 2004/0219969 | A1 | 11/2004 | Casey et al. |
| 2004/0242313 | A1 | 12/2004 | Munoz |
| 2004/0242315 | A1 | 12/2004 | Paulsen et al. |
| 2004/0254011 | A1 | 12/2004 | Muskin |
| 2005/0009607 | A1 | 1/2005 | Russell et al. |
| 2005/0029745 | A1 | 2/2005 | Walker et al. |
| 2005/0037838 | A1 | 2/2005 | Danaevsky et al. |
| 2005/0054429 | A1 | 3/2005 | Baerlocher et al. |
| 2005/0059474 | A1 | 3/2005 | O'Halloran |
| 2005/0059481 | A1 | 3/2005 | Joshi et al. |
| 2005/0060050 | A1 | 3/2005 | Baerlocher |
| 2005/0071023 | A1 | 3/2005 | Gilliland et al. |
| 2005/0079911 | A1 | 4/2005 | Nakatsu |
| 2005/0090306 | A1 | 4/2005 | Seelig et al. |
| 2005/0130730 | A1 | 6/2005 | Lind et al. |
| 2005/0130737 | A1 | 6/2005 | Englman et al. |
| 2005/0159211 | A1 | 7/2005 | Englman |
| 2005/0176494 | A1 | 8/2005 | Thomas |
| 2005/0202863 | A1 | 9/2005 | Macaulay |
| 2005/0208992 | A1 | 9/2005 | Randall |
| 2005/0215311 | A1 | 9/2005 | Hornik et al. |
| 2005/0218590 | A1 | 10/2005 | O'Halloran et al. |
| 2005/0233803 | A1 | 10/2005 | Yang |
| 2005/0282615 | A1 | 12/2005 | Englman et al. |
| 2005/0282625 | A1 | 12/2005 | Nicely |
| 2005/0282629 | A1 | 12/2005 | Gagner |
| 2005/0285337 | A1 | 12/2005 | Durham et al. |
| 2006/0003834 | A1 | 1/2006 | Okada |
| 2006/0009283 | A1 | 1/2006 | Englman et al. |
| 2006/0009286 | A1 | 1/2006 | Durham et al. |
| 2006/0014580 | A1 | 1/2006 | Hawthorn |
| 2006/0025193 | A1 | 2/2006 | Gail et al. |
| 2006/0025211 | A1 | 2/2006 | Wilday et al. |
| 2006/0030390 | A1 | 2/2006 | Okada |
| 2006/0058095 | A1 | 3/2006 | Berman et al. |
| 2006/0063580 | A1 | 3/2006 | Nguyen et al. |
| 2006/0069619 | A1 | 3/2006 | Walker et al. |
| 2006/0073873 | A1 | 4/2006 | Rodgers et al. |
| 2006/0073897 | A1 | 4/2006 | Englman et al. |
| 2006/0094495 | A1 | 5/2006 | Gelber et al. |
| 2006/0111170 | A1 | 5/2006 | Hornik et al. |
| 2006/0142077 | A1 | 6/2006 | Miles et al. |
| 2006/0148548 | A1 | 7/2006 | Hornik et al. |
| 2006/0160607 | A1 | 7/2006 | Okada |
| 2006/0205480 | A1 | 9/2006 | Glavich et al. |
| 2006/0287034 | A1 | 12/2006 | Englman et al. |
| 2006/0287062 | A1 | 12/2006 | Okada |
| 2007/0021182 | A1 | 1/2007 | Gauselmann |
| 2007/0021215 | A1 | 1/2007 | Russell et al. |
| 2007/0060247 | A1 | 3/2007 | Low et al. |
| 2007/0135207 | A1 | 6/2007 | Tarantino |
| 2007/0213115 | A1 | 9/2007 | Fujimoto |
| 2008/0058078 | A1 | 3/2008 | Fong |

FOREIGN PATENT DOCUMENTS

| | | |
|---|---|---|
| DE | 3105266 | 9/1982 |
| EP | 0 558 307 | 2/1993 |
| EP | 753 331 | 1/1997 |
| EP | 874 337 | 10/1998 |
| EP | 945 837 | 9/1999 |
| EP | 0 981 119 | 2/2000 |
| EP | 0 984 407 | 3/2000 |
| EP | 989 531 | 3/2000 |
| EP | 1 076 321 | 2/2001 |
| EP | 1 195 730 | 4/2002 |
| EP | 1 513 116 | 9/2004 |
| EP | 1 589 501 | 11/2004 |
| EP | 1 536 388 | 1/2005 |
| EP | 1 580 701 | 3/2005 |
| EP | 1 513 114 | 6/2005 |
| GB | 970806 | 9/1964 |
| GB | 2 137 392 | 10/1984 |

(56) References Cited

FOREIGN PATENT DOCUMENTS

| | | |
|---|---|---|
| GB | 2 292 245 | 2/1996 |
| GB | 2 322 217 | 8/1998 |
| GB | 2 382 911 | 6/2003 |
| GB | 2 387 950 | 10/2003 |
| JP | 7213738 | 8/1995 |
| WO | WO 85/00910 | 2/1985 |
| WO | WO 98/00207 | 1/1998 |
| WO | WO 99/03078 | 1/1999 |
| WO | WO 02/078804 | 10/2002 |
| WO | WO 03/026757 | 4/2003 |
| WO | WO 2005/077480 | 8/2005 |
| WO | WO 2005/083599 | 9/2005 |
| WO | WO 2006/014833 | 2/2006 |
| WO | WO 2006/015442 | 2/2006 |
| WO | WO 2006/017431 | 2/2006 |
| WO | WO 2007/090270 | 8/2007 |

OTHER PUBLICATIONS

Big Time Red, White & Blue Advertisement written by IGT, published 2005.
Bonus Games Advertisement written by IGT, published in 1999.
Creepy and Kooky Article written by Frank Legato, published by Strictly Slots in Jul. 2000, pp. 52-54.
Fey, Slot Machines, a Pictorial History of the First 100 Years, Liberty Belle Books, 1983, pp. 215, 219.
Jackpot Party Advertisement on website page http://www.wmsgaming.com/products/slot/jpp/index.html, printed on Mar. 21, 2001.
Jackpot Party Brochures and Articles written by WMS Gaming, Inc., published Mar. 1998.
Jackpot Party Video 9-Line Advertisement written by WMS Gaming, Inc., available in 1999.
Jeopardy Advertisement written by IGT, published in 2000.
Jeopardy Video Slots advertisement written by IGT, published in 2000.
Jeopardy, Mega Jackpots Advertisement written by IGT, published in 1998.
Power Slotto Brochure published by AC Coin & Slot prior to 2002 in or before December thereof.
Slot Machines, A Pictorial History of the First 100 Years, written by Marshall Fey, published by Liberty Belle Books, 1983, 1989, 1991, 1994, 1997.
Super Times Pay Poker Advertisement, written by IGT, published in 2003.
Totem Pole Advertisement, written by IGT, published in 1997, in or before December thereof.
TURBOREEL by Barcrest, available prior to Apr. 14, 2003 (with English Translation).
We Make Gaming Fun! Advertisement written by WMS Gaming Inc., available prior to Apr. 14, 2003.
Play It Again Poker Brochure, written by IGT, published in 1999.
Bunco Dice History and Rules, printed from http://world-bunco.com/history.html, on May 22, 2000.
Slots 2003 Article written by Melissa Raimondi, published in Jan. 2003.
Super Bonus Poker by Bally Gaming, described in Strictly Slots, published in Apr. 2000.
Multi-Play Poker by Bally Gaming, described in Strictly Slots, published in Dec. 2000.
Multi-Play Poker by Bally Gaming, printed from ballygaming.com/products/multi-play-poker.html on Apr. 25, 2001.
Wheel of Madness Game, described in AC Coin & Slot brochure, published in 2000.
Monopoly Blackjack Edition Game, described in Mikohn brochure, published in 2000.
Multi-Action Blackjack brochure, http://conjelco.com/faq/bj.html from Apr. 25, 2001, printed on Jul. 30, 2001.

* cited by examiner

GAMING SYSTEM HAVING A COMMON DISPLAY, A FIRST BONUS GAME OR A FIRST BONUS GAME PAYTABLE AND AN OPTION TO PURCHASE A SECOND BONUS GAME OR A SECOND BONUS GAME PAYTABLE WITH RELATIVELY EXPECTED HIGHER VALUES

PRIORITY CLAIM

This application is a continuation of, and claims priority to and the benefit of, U.S. patent application Ser. No. 12/769,278, filed on Apr. 28, 2010, which is a continuation of, and claims priority to and the benefit of, U.S. patent application Ser. No. 11/224,444, filed on Sep. 12, 2005, which issued as U.S. Pat. No. 7,727,068 on Jun. 1, 2010, the entire contents of each of which are incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming devices provide enjoyment and excitement to players, in part, because they may ultimately lead to monetary awards for the players. Gaming devices also provide enjoyment and excitement to the players because they are fun to play. Bonus games, in particular, provide gaming device manufacturers with the opportunity to add enjoyment and excitement to that which is already expected from a base game of the gaming device. Bonus games provide extra awards to the player and usually enable the player to play a game that is different than the base game.

Gaming devices are typically games of luck, not skill, in most jurisdictions. Primary games are set up to pay back a certain percentage of the amount of money wagered on in the base or primary game of gaming machine. The average payout percentage in most primary games is set high enough that any player who plays a few hands or spins of the reels wins. That is, in most primary games it is not too difficult to experience some level of success.

Secondary games or bonus games are typically set up for the player to succeed. The player usually wins an award in a bonus game. In bonus game play, the goal is often to maximize the possible award. Winning, at least on some level, is therefore a standard component in gaming devices.

A continuing need exists to provide gaming devices that issue awards in an exciting and enjoyable manner. It is desirable to provide new and different gaming machines.

SUMMARY

The present disclosure provides a gaming system including a plurality of independently and individually operated gaming devices and a shared or a common secondary display associated with the gaming devices. In one embodiment, the shared display is adjacent to one or more of the gaming devices of the gaming system. The gaming system includes at least one primary game operable at each gaming machine and at least one secondary or bonus game. The bonus game has a plurality of different average expected payouts or values. In one embodiment, the bonus game played on the individual gaming devices has a first average expect payout, and the bonus game played on the common display has a second average expected payout. In one embodiment, the bonus game that is played on the secondary display has a higher average expected payout or higher values than the average expected payouts or values of the bonus game played on the individual gaming devices. The gaming machine enables the player to place at least one of a plurality of wagers. The wagers include at least one designated wager. When a player places one of the plurality of wagers, the gaming device enables the player to play the primary game. If a triggering event occurs, the gaming device determines if the player placed the designated wager. In one embodiment, when the player places one of the plurality of wagers, but does not place the designated wager, the player qualifies to play the bonus game on the individual gaming device. When the player places a designated wager, the player qualifies to play the game on the secondary display and thus qualifies for a chance to win or achieve the higher average expected bonus awards.

It should be appreciated that the designated wager may be determined and defined in any suitable manner. In one embodiment, the designated wager does not affect the primary game outcome or award. In one such embodiment, the designated wager is a separate side wager or a side bet. The gaming device enables the player to place at least one wager for the primary game. This primary game wager, in combination with the primary game outcome, determines any award for the player for the primary game. In this embodiment, the gaming device enables the player to place a side bet to qualify to play the bonus game on the big screen or shared display with higher values or a higher average expected payout. If the player places the side wager and the triggering event occurs, the gaming device enables the player to play the bonus game on the shared secondary display. It should be appreciated that the side wager does not affect the award of the primary game. In one embodiment, this side wager affects the award for the bonus game. In an alternative embodiment, this side wager does not affect the award for the bonus game.

In another embodiment, a designated level of the wager on the primary game (such as a maximum wager on the primary game) is the designated wager. It should be appreciated that more than one of the wagers may be the designated wager. That is, there may be multiple designated wagers. For example, a gaming machines enables a player to wager on one of a plurality of wagers in a primary game. The wagers are a $1 wager, a $2 wager, a $3 wager, a $4 wager and a $5 wager. In one embodiment, both the $4 wager and the $5 wager are designated wagers. That is, if the player either wagers the $4 wager or the $5 wager for the primary game and obtains the triggering event, the player is enabled to play the bonus game on the shared display. In one embodiment, the wager affects the award of the primary game. In an alternative embodiment, the wager does not affect the award of the primary game. In one embodiment, the wager affects the award of the bonus game. In another embodiment, the wager does not affect the award of the bonus game.

In another embodiment, the designated wager is made up or more than one wager. That is, if the plurality of wagers includes A, B, C and D, in one embodiment, the placement of B and C is the designated wager. That is, to qualify to play the game on the shared display, the player must place both the B wager and the C wager.

In one embodiment, if the player wagers the designated wager and the triggering event occurs, the gaming device enables the player to play the bonus game on the shared secondary display. In one embodiment, the bonus game of the secondary display includes higher values or has a higher average expected payout than the bonus game played in the individual gaming devices. By wagering the designated wager, the player has a chance to win a greater award. That is, the player has the option to purchase the chance to win a larger bonus award. The gaming device provides the player with an outcome based on the bonus game.

In another embodiment, the one of the wagers includes a threshold amount, such as a maximum bet. In one embodiment, the wagering of the threshold amount qualifies the player to play the game on the shared secondary display but without higher values or a higher average expected payout. The placement of the designated wager qualifies the player to play the bonus game on the shared secondary display with the higher values or higher average expected payout. That is, when a player wagers the threshold amount of one of the wagers but does not wager the designated wager, upon the bonus game triggering event, the gaming system enables the player to play the game on the shared secondary display without the higher average payout or higher expected values. This bonus game has the same average expected payout as the bonus game of the individual gaming devices. When a player wagers the designated wager, upon the bonus game triggering event, the gaming system enables the player to play the game on the shared secondary display with the higher average payout or higher expected values.

In one embodiment, the bonus game is associated with a plurality of paytables. In one embodiment, the paytables have different expected average payouts. That is, some paytables, on average, result in a higher average payback to the player than the other paytables. If a player places a wager at one of the gaming devices, the gaming device provides the player with an opportunity to place the designated wager to qualify to play the secondary game on the shared display. The paytable employed in the bonus game is determined, at least in part, on whether the player places the designated wager. In one embodiment, the paytables associated with the bonus game played on the secondary display or the designated wager have a higher average expected payout than the paytables associated with the bonus game played on the individual gaming devices. That is, by placing the designated wager the player has a greater chance of winning a higher payout or award if they qualify to play the bonus game on the secondary display than if they did not place the designated wager and they play the bonus game on their individual gaming device.

The present system thus rewards a player who inputs a designated wager by providing the player a chance to receive a higher or a better award in the bonus or secondary game. The present system also rewards a player by providing the bonus or secondary game on the shared secondary display for other players and other people in the casino to readily see. This public bonus round is exciting for other people in the casino to watch.

It is therefore an advantage of the gaming system to provide a display shared by a plurality of gaming machines which is operable to display a bonus game.

It is therefore an advantage of the gaming system to enable a player to place a designated wager to qualify for a chance to win a higher award wherein the higher award is displayed on a shared display.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
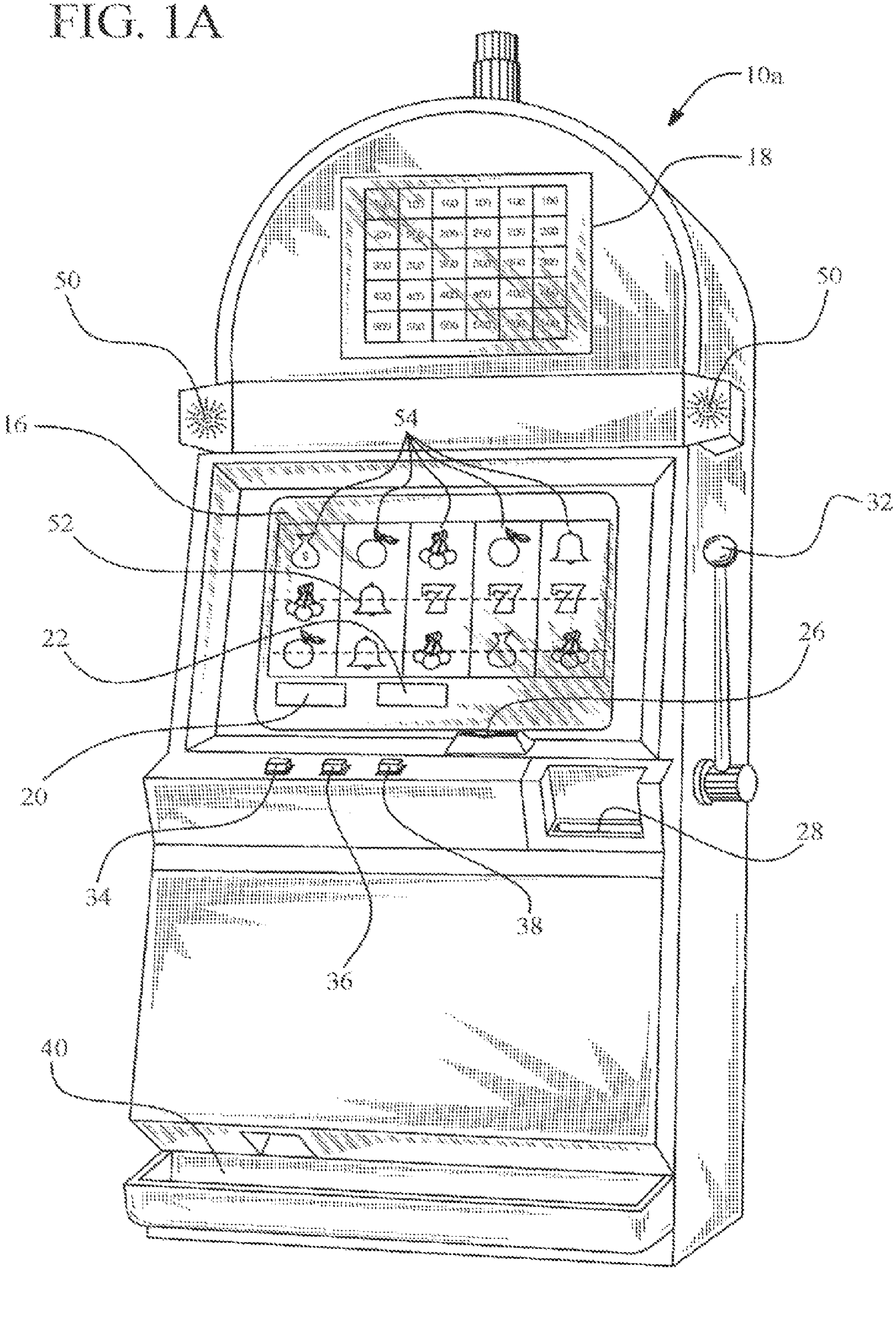
FIGS. 1A and 1B are perspective views of alternative embodiments of the gaming devices of the present disclosure.
Figure 1B:
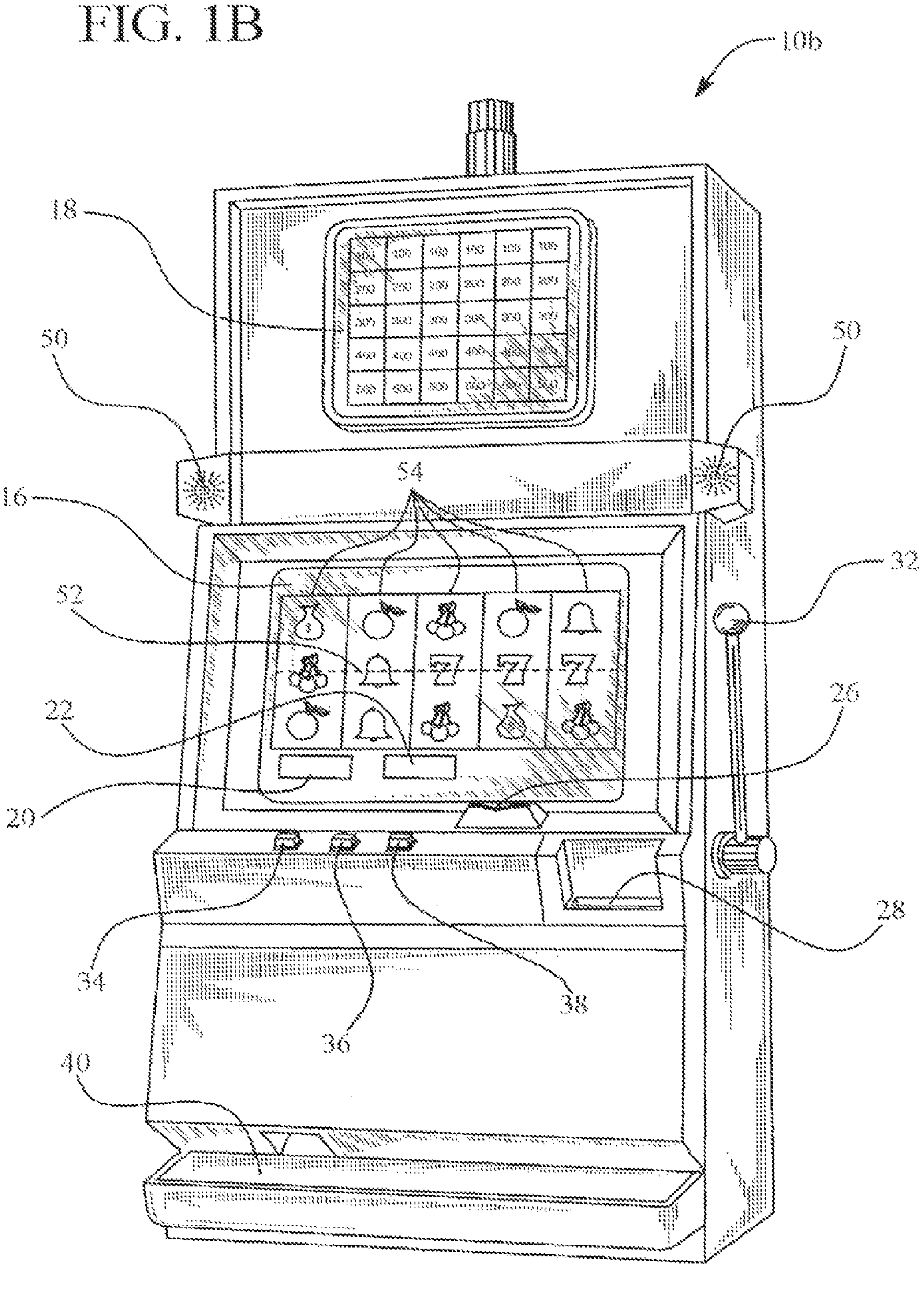

Referring now to the drawings, two alternative embodiments of the gaming device are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
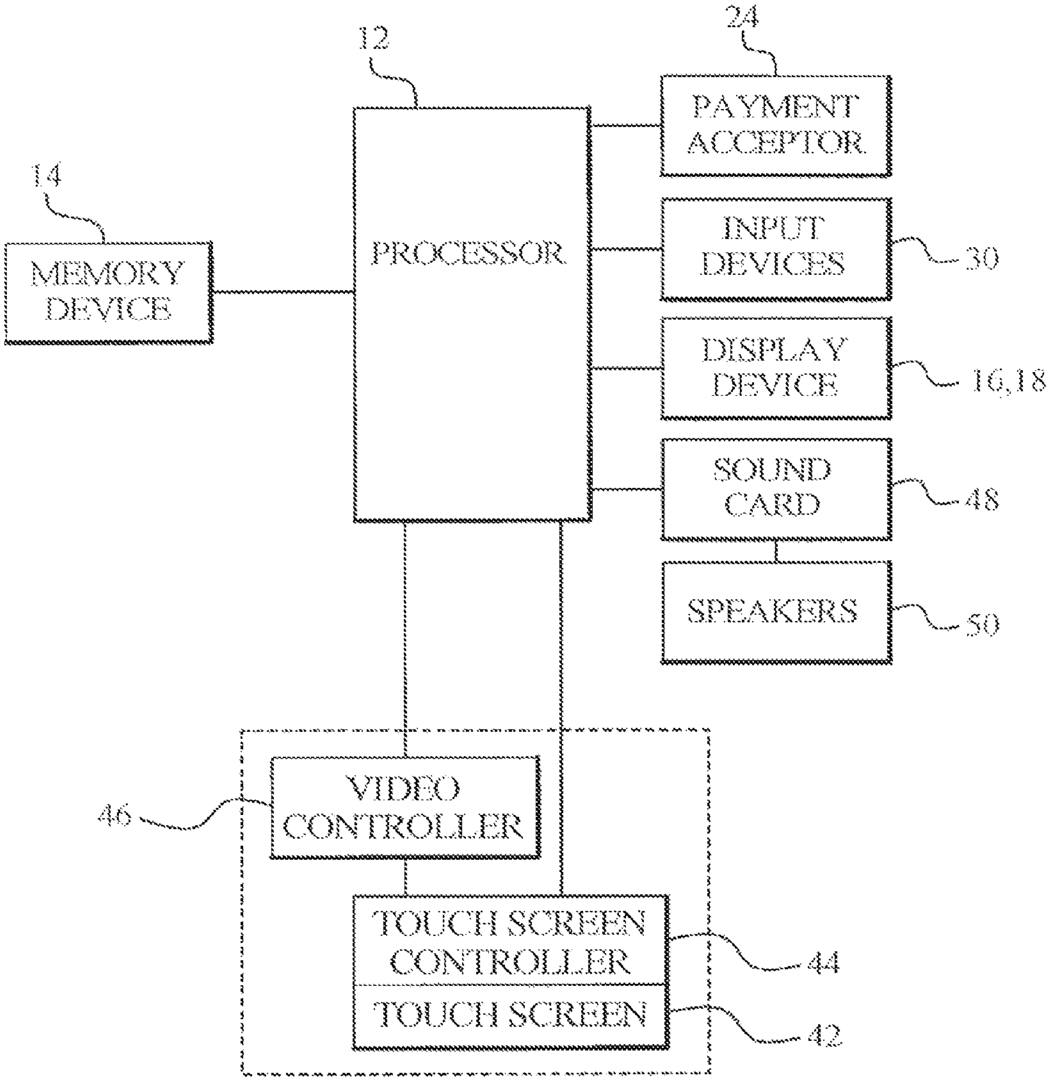
FIG. 2A is a schematic block diagram of the electronic configuration of one embodiment of the gaming devices of the present disclosure.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the art. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome. Such random determination could be provided through utilization of a random number generator (RNG) or other suitable randomization process.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses. In another embodiment, upon a player initiating game play at the gaming device, the gaming device enrolls in a bingo game. In this embodiment, a bingo server calls the bingo balls that result in a specific game outcome. The resultant game outcome is communicated to the individual gaming device to be provided to a player.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. In another embodiment, at least one display device may be a mobile display device, such as a PDA or tablet PC, that enables play of at least a portion of the primary or secondary game at a location remote from the gaming device. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display including a projected and/or reflected image or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, one or more of the display devices, as described above, display the plurality of simulated video reels 54. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active payline or otherwise occur in a winning pattern, occur on the requisite number of adjacent reels and/or occur in a scatter pay arrangement.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game could be accomplished through a simple "buy in" by the player if, for example, the player has been unsuccessful at qualifying through other specified activities.

Figure 2B:
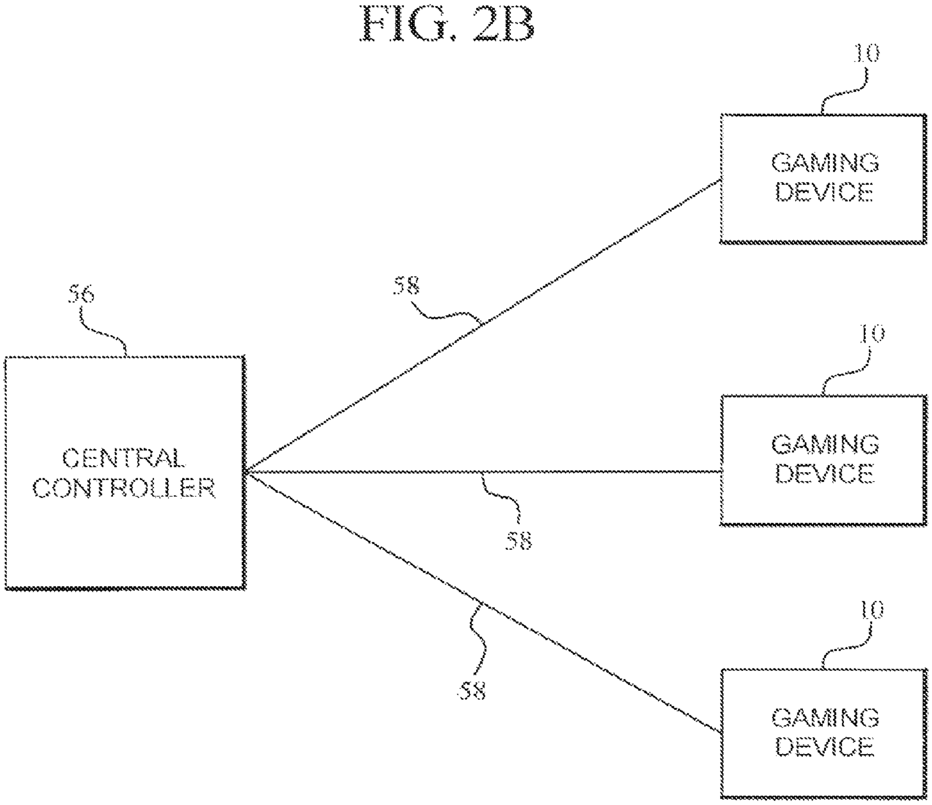
FIG. 2B is a schematic block diagram illustrating a plurality of gaming terminals in communication with a central controller.

In one embodiment, as illustrated in FIG. 2B, one or more of the gaming devices 10 may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo or keno game. In this embodiment, each individual gaming device utilizes one or more bingo or keno games to determine the predetermined game outcome value provided to the player for the interactive game played at that gaming device. In one embodiment, the bingo or keno game is displayed to the player. In another embodiment, the bingo or keno game is not displayed to the player, but the results of the bingo or keno game determine the predetermined game outcome value for the interactive game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a "daub" button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In another embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaining device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a "chip" to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer. In one embodiment, an individual gaming machine may trigger a progressive win, for example through a game play event such as a symbol-driven trigger. In one embodiment, the central server or other central controller determines when a progressive win is triggered. In one embodiment, a central controller and an individual gaming machine work in conjunction with each other to determine when a progressive win is triggered, for example through an individual gaming machine meeting a predetermined requirement established by the central controller.

Figure 3:
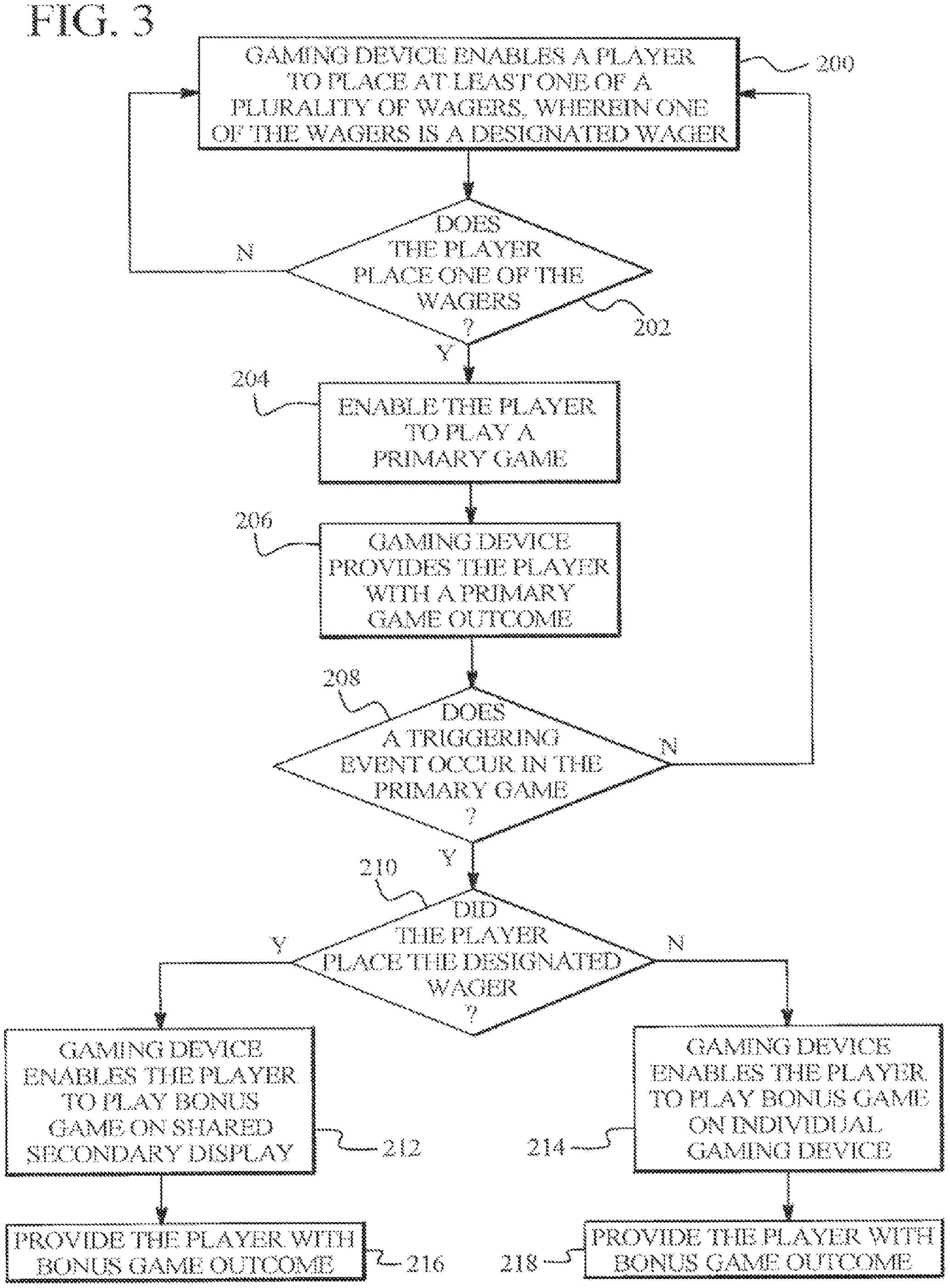
FIG. 3 is a flow chart of the method of one embodiment disclosed herein, illustrating that placing an additional wager qualifies the player for a chance to play the bonus game on the secondary display with higher values.
Figure 4:
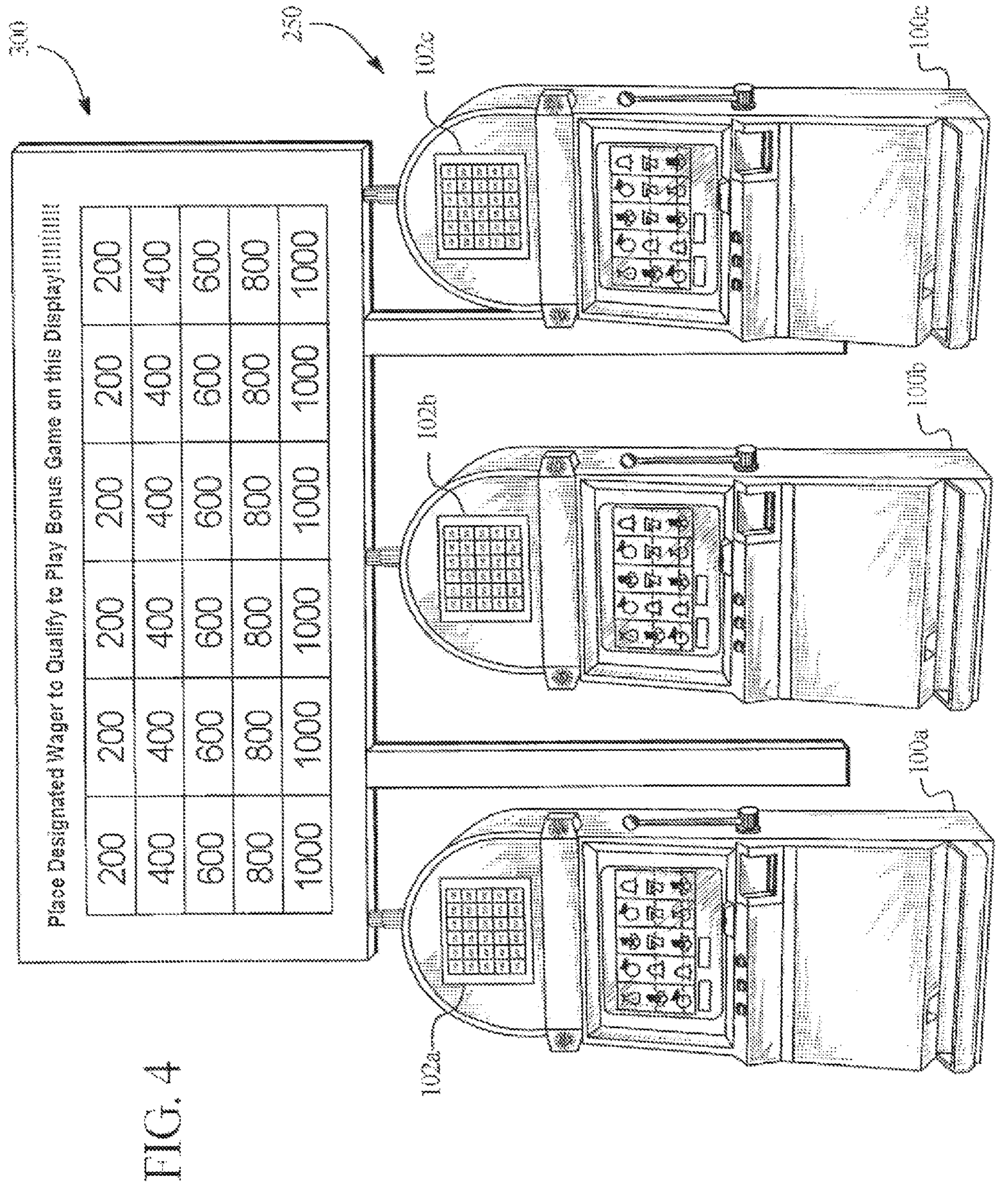
FIG. 4 is a front elevation view of the gaming system of the present disclosure.

Now referring to FIGS. 3 and 4, the gaming system of one embodiment of the present disclosure includes a plurality of gaming devices and a common bonus display or shared secondary display. FIG. 3 is a flow diagram illustrating one such embodiment, wherein the primary game wager is a first wager and the designated wager is an additional wager.

As illustrated in FIG. 3, each of the gaming devices enables the player to place one of a plurality of wagers, wherein the wagers include a designated wager 200. The gaming device determines if the player places one of the wagers 202. The gaming device enables the player to play the primary game 204 and provides the player with a primary game outcome 206. If a triggering event does not occur in the primary game, 208, the gaming device enables the player to place one of a plurality of wagers, wherein the wagers include a designated wager 200. If a triggering event does occur in the primary game 210, the gaming machine determines if the player placed the designated wager. In one embodiment, when the player places the designated wager, the gaming device enables the player to play the bonus game on the shared secondary display which is associated with higher average expected values or awards than the bonus game played on the individual gaming devices. If the player inputs the designated wager amount 210 and a triggering event occurs in the primary game 208, the gaming device enables the player to play the bonus game on the shared secondary display 212. The gaming device provides the player with a bonus game outcome 216. If the triggering event occurs in the primary game and the player does not place the designated wager, the gaming device enables the player to play the bonus game on that player's respective gaming device 214. The gaming device provides the player with a bonus game outcome 218.

Referring now to FIG. 4, one embodiment of the gaming system 250 is illustrated. The gaming system 250 includes a plurality of gaming devices 100*a*, 100*b* and 100*c*. It should be appreciated that the gaming devices may be any suitable gaming device. The gaming system includes a shared secondary display, bonus display or shared display 300. In one embodiment, the bonus display 300 is connected to or is adjacent to a plurality or all of the gaming devices 100*a*, 100*b* and 100*c* of the gaming system. It should be appreciated that the secondary display may be any suitable shape and any suitable size. It should be appreciated that the gaming devices 100*a*, 100*b* and 100*c* may include any combination of the functions or features described above with respect to gaming device 10.

The gaming system includes a primary game which includes or is associated with a triggering event. The gaming system includes a secondary or bonus game which is triggered upon the occurrence of the triggering event in the primary game. In one embodiment, the bonus game is associated with a plurality of values and/or a plurality of paytables.

In one embodiment, the shared secondary display 300 displays the same bonus game as the display devices 102*a*, 102*b* and 102*c* of each of the individual gaming devices 100*a*, 100*b* and 100*c* but includes higher values than the values of the bonus games of the individual gaming devices. That is, when a player qualifies to play the bonus game on the bonus display or the shared display, they qualify to be awarded the higher values of the bonus game of the secondary display. It should be appreciated that playing the bonus game of the shared display may offer a benefit to the player in any suitable manner. In one embodiment, the benefit is playing a game that everyone passing by can see. In another embodiment, the bonus game of the shared display includes one or more higher values than the bonus games of the individual gaming devices. In another embodiment, the bonus game of the shared display is associated with a higher average payout. The awards of the bonus game of the shared display may be different from the awards of the bonus games of the individual gaming machines in any suitable manner.

Figure 5A:
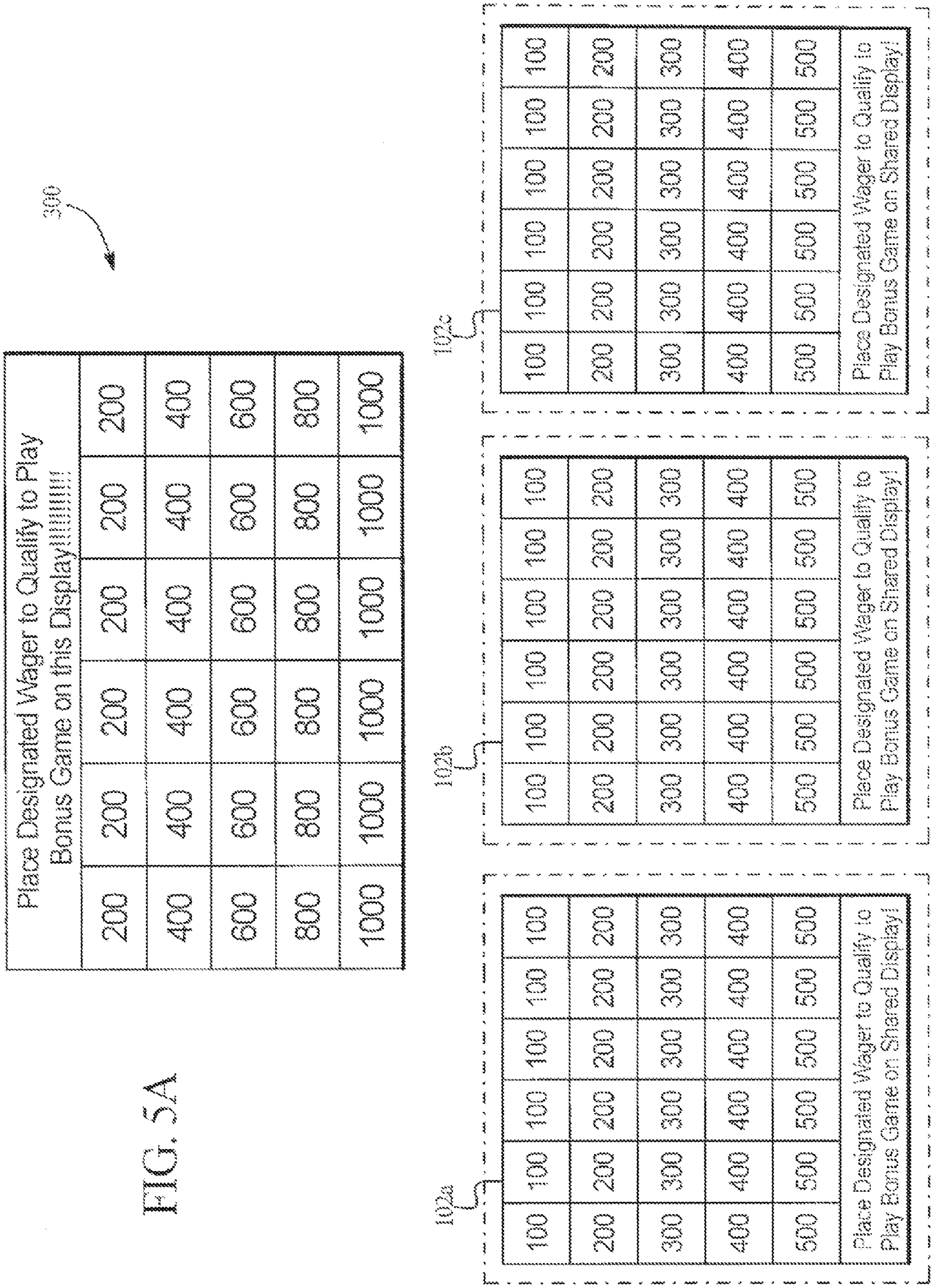
FIGS. 5A, 5B and 5C are elevation views of the shared display and the display devices of the gaming system of the present disclosure, illustrating a play of the bonus game with and without the additional wager.
Figure 5B:
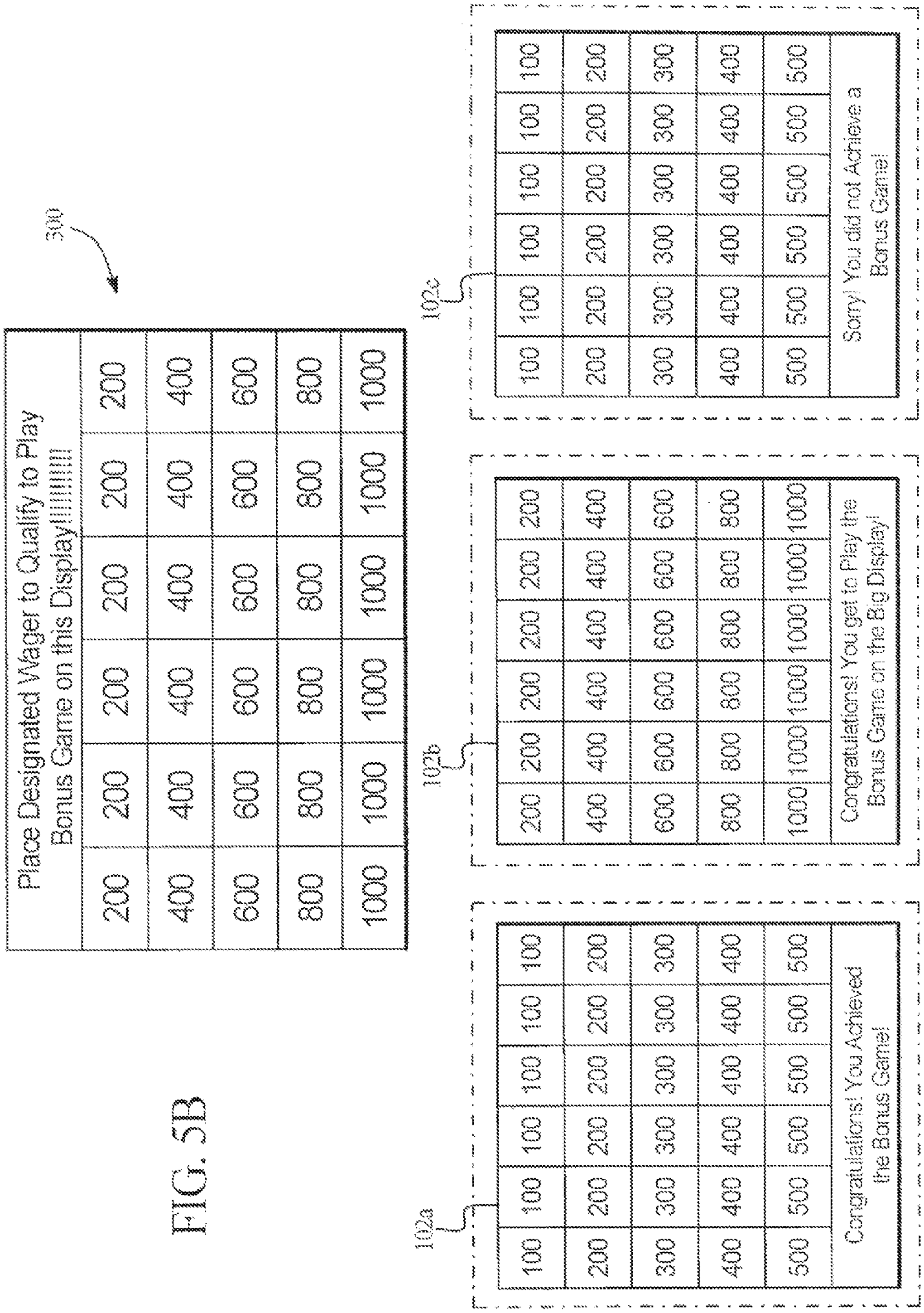
Figure 5C:
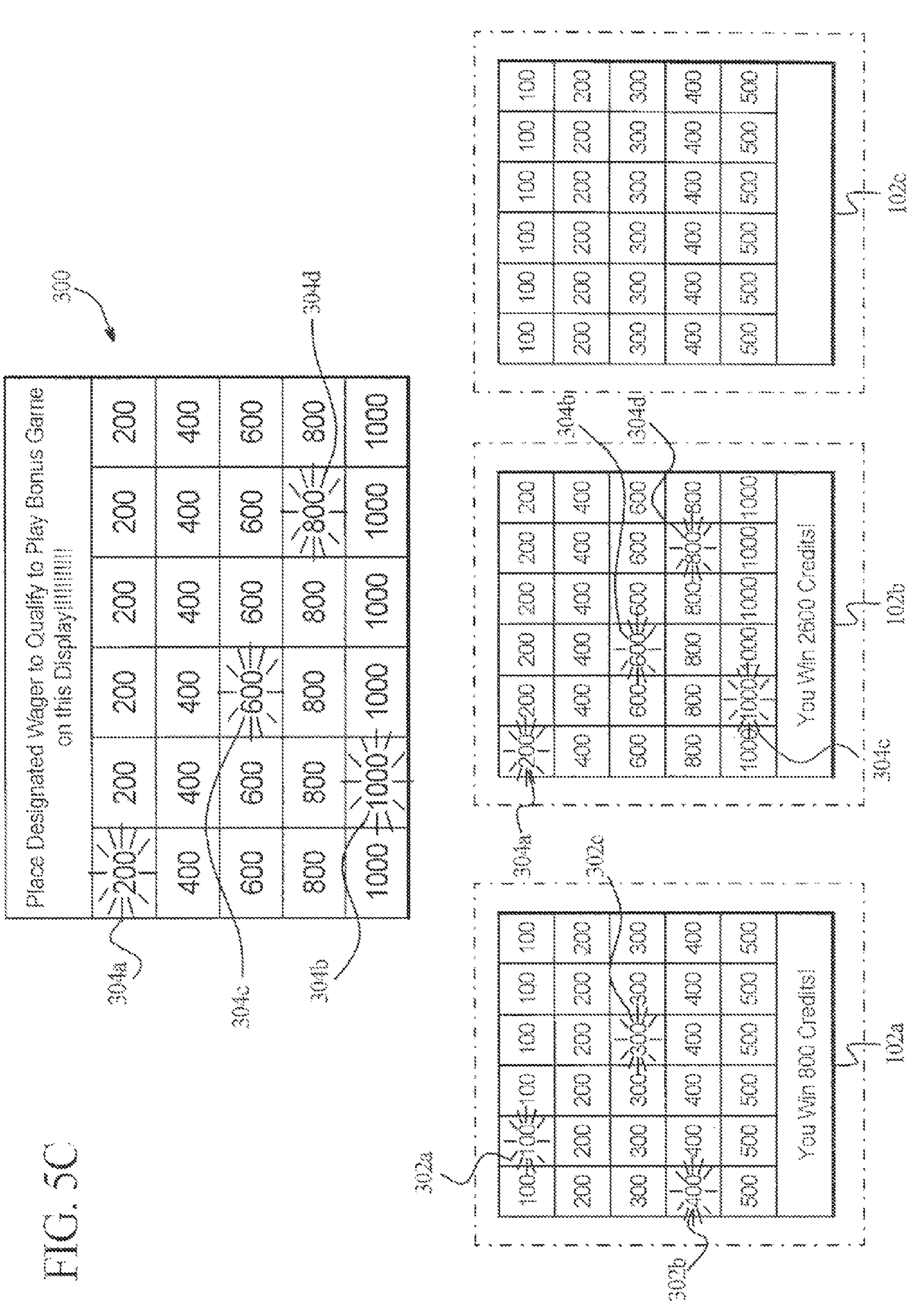

As illustrated in FIGS. 5A to 5C, in one embodiment, the awards or values of the bonus game of the secondary display have higher values than the awards of the bonus game of the individual gaming devices. In one example of this embodiment, the bonus game of the secondary display also has a higher expected payout than the bonus game of the individual gaming devices.

FIGS. 5A to 5C display a plurality of screen shots 102*a*, 102*b* and 102*c* of the display devices of the respective gaming devices 100*a*, 100*b* and 100*c* in combination with a screen shot of the shared secondary display 300. In the illustrated embodiment, each of the display devices 102*a*, 102*b* and 102*c* of the gaming machines displays the same bonus game. That is, each of the display devices of the gaming machines 102*a*, 102*b*, and 102*c* and the secondary display 300 display a secondary game including a grid of values. The values in the bonus game displayed on the secondary display 300 are higher in value than the values of the bonus game of the individual gaming device displays 102*a*, 102*b*, and 103*c*. In one embodiment, the values of the secondary display are twice the value of the correlating awards displayed in the bonus game of the individual gaming devices. For example, the 100 value in the upper-left hand corner of the grid of the bonus game is displayed on each of the individual gaming devices. The correlating square of the grid of the secondary display has a value of 200.

In this embodiment, as illustrated in 5A, the gaming devices enable each player to place at least one of a plurality of wagers, where the wagers include a designated wager. After one or more players places one of the wagers (not illustrated), the gaming machines enable the player to play a primary game. If a triggering event occurs in or in association with the primary game, the gaming device determines if the player placed the designated wager. If the player placed the designated wager, the gaming machine enables the player to play the bonus game on the shared display.

In one embodiment, the player at the second gaming machine 100*b* places the designated wager (not illustrated) and the players at the first gaming machine 100*a* and the third gaming machine 100*c* do not place the designated wager (not illustrated). Therefore, in one embodiment, only the player of the second gaming machine 100*b* is qualified for a chance to play the bonus game on the secondary bonus display.

Referring now to FIG. 5B, after a play of the primary game, each of the gaming devices prompts the player as to the status of the bonus game. For example, the first display device 102*a* prompts the player "congratulations, you achieved the bonus game," the second display device 102*b* prompts the player "congratulations, you get to play the bonus game on the big display." and the last display device 102*c* prompts the player "sorry, you did not achieve a bonus game." That is, the first and the second gaming machines had the occurrence of triggering events. The third gaming machine did not have the occurrence of a triggering event. However, only the second player is enabled to play the bonus game on the shared display because only the second wager placed the designated wager.

Now referring to FIG. 5C, the first gaming device 102*a* and the second gaming device 102*b* generate outcomes for the bonus game. It should be appreciated that in one embodiment, when a player qualifies to play the bonus game on the secondary display, the display device of that gaming device displays the bonus game of the secondary display. For example, a value of 200 is displayed in the upper-left-hand corner of the grid on the bonus display 300 and a value of 200 is displayed in the upper-left-hand corner of the grid of the second display device 102*b*.

It should be appreciated that the bonus game may be played in any suitable matter. As illustrated in FIG. 5C, in one embodiment, the gaming system randomly generates awards or values in the bonus game.

As illustrated in FIG. 5C, in the bonus game the first display device 102*a*, the gaming device generates an award of 100, labeled 302*a*, an award of 400, labeled 302*b* and an award of 300, labeled 302*c*. In one embodiment, the gaming device 100*a* provides the player with an award, based at least in part, on the awards generated in the bonus game. For example, in the illustrated embodiment, the gaming device 100*a* provides the player with an award of 800.

As illustrated in FIG. 5C, since the player of the second gaming machine 100*b* placed the designated wager and achieved the triggering event in the primary game, the gaming system enables the player to play the bonus game with awards that are higher in value than the awards or values of the bonus game played on the individual gaming devices. It should be appreciated that the awards may be higher in any increment or in any amount in the bonus game played on the shared display. The second gaming device generated a value or award of 200, labeled 304*a*, 1000, labeled 304*b*, 600, labeled 04*c* and an award of 800, labeled 304*d*. These awards are indicated both on the shared display 300 and on the display device 102*b* of the second gaming machine.

In one embodiment, the gaming device provides the player with the sum of the generated awards. As discussed above, the gaming device indicates to the player of the first gaming device 100*a* that they win 800. The secondary display device 102*a* displays a message "You win 800 credits" which is the sum of the awards randomly generated for 102*a*. The gaming device 100*b* indicates to the player of the second gaming machine 100*b* via the secondary display 102*b* device "You win 2600 credits" which is the sum of the values randomly generated by the gaming system for bonus game including the shared display.

It should be appreciated that the secondary or bonus game may be any suitable game. In one embodiment, the secondary game is a value game as displayed in FIGS. 5A to 5C but the values in the columns are not arranged in ascending order. In one embodiment, a plurality of the columns display one or more different numbers than another one of the columns or in a different order than one of the other columns. The values may be repeated and may be different for each column. For example, a first column displays 200, 100, 500, 400 and 500 and the next adjacent column displays 500, 200, 200, 300, and 400. It should be appreciated that the values of the bonus game may be displayed in any suitable manner.

In one embodiment, the bonus game is a player selection game. In one embodiment, the bonus game displays a plurality of selections. In one embodiment, the selections are values. In one embodiment, each of the displayed values or selections is an activator symbol or a terminator symbol. In one embodiment, when a player selects an activator symbol, the gaming device enables the player to select another symbol. The game continues until the player selects a terminator symbol. The gaming device provides the player an award based on the selections. It should be appreciated that the activator and terminator symbols may be determined in any suitable manner. In one embodiment, the same symbol (such as all displayed 100 symbols) are either activator or terminators. In another embodiment, each displayed symbol is individually determined to be an activator or terminator. That is, when two of the same symbol (two 100 symbols) are displayed at different locations, one symbol may be an activator and one symbol may be a terminator. It should be appreciated that a bonus selection game may be provided in any suitable manner.

It should be appreciated that the secondary or bonus game may be any suitable secondary or bonus game. In one embodiment, the game displayed on the secondary display is the same game as the bonus game displayed on the individual gaming devices but includes higher values. In one embodiment, the bonus game of the secondary display is the exact same game as the bonus game of the individual gaming devices but the bonus game of the secondary display is associated with a higher average expected payout than the average expected payout of the bonus game of the individual gaming devices. That is, when a player plays the game on the secondary display, the player on average wins a larger amount than the player on average of the bonus game of the individual gaming device.

It should be appreciated that the gaming system may include more than one type of bonus game. In one embodiment, the secondary display displays a different bonus game than the individual gaming devices. Thus, when the player wagers the designated wager and has the occurrence of a triggering event in the primary game, the player plays a different secondary game on the secondary display than the game played on the other gaming devices.

It should be appreciated that the bonus game of the secondary display may be associated with higher awards or a higher expected payout in any suitable manner. In one embodiment, the bonus game is associated with a plurality of average expected payouts. In one embodiment, the bonus game of the shared display is associated with a higher average expected payout than the bonus game played on the individual gaming devices. In one embodiment, the bonus game of the shared display includes at least one higher award than the bonus game of the individual gaming devices. In one embodiment, the bonus game of the shared display includes a high award or a jackpot award. In one embodiment, the bonus game of the shared display includes higher and lower awards than the bonus game of the individual gaming devices. Thus, the player has a chance to receive a higher award by placing the designated wager.

In one embodiment, the bonus game of the shared display is associated with a plurality of different paytables. Whether or not the player places the designated wager determines which paytable is employed in the bonus game. In one embodiment, the gaming system associates a paytable with a higher average expected payout with the bonus game of the shared display than the paytables associated with the bonus games of the individual gaming devices. In one embodiment, the paytable associated with the bonus game played on the shared secondary display has substantially the same average expected payout as the paytables associated with the bonus games played on the gaming devices but has a higher volatility. The volatility pertains to the range of the values of the awards. For example, the paytable associated with the bonus game of the secondary display may include higher and lower values than the paytable associated with the bonus game of the individual gaming devices. It should be appreciated that the paytable associated with the bonus game of the secondary display may have a higher expected payout determined by any suitable manner.

In one embodiment, the gaming machine enables the player to place at least one of a plurality of wagers, wherein one of the wagers is the designated wager. In one embodiment, the wagers are placed at the same time. In one embodiment, the player can place a wager amount and designated portions of the wager amount for the different wagers. In one embodiment, the wagers include a separate wager for the primary game and a designated wager. In one embodiment, the designated wager is a maximum bet. For example, the player is enabled to wager $1 $3 or $5 and $5 is the maximum bet. If the player wagers either $1 or $3, the gaming machine enables the player to play the primary game and provides the primary game award. In one embodiment, if the player achieves the triggering event, the gaming device enables the player to play the game on the individual display device. If the player wagers the $5 and obtains the triggering event, the gaming system enables the player to play the game on the shared display. In one such embodiment, the designated wager determines the award for the primary game. In one embodiment, the shared display includes higher values or a higher payback percentage.

In another embodiment, at least one of the wagers includes a threshold amount or one of the wagers is a maximum amount and the designated wager is a side wager or a separate wager from the wager with the threshold amount. In one embodiment, the wagering of the threshold amount qualifies the player to play the game on the shared secondary display but without higher values or a higher average expected payout. The placement of the designated wager qualifies the player to play the bonus game on the shared secondary display with the higher values or higher average expected payout. That is, when a player wagers the threshold amount of one of the wagers but does not wager the designated wager, upon the bonus game triggering event, the gaming system enables the player to play the game on the shared secondary display without the higher average payout or higher expected values. This bonus game has the same average expected payouts or wagers as the bonus games of the individual gaming devices. When a player wagers the designated wager, upon the bonus game triggering event, the gaming system enables the player to play the game on the shared secondary display with the higher average payout or higher expected values.

It should be appreciated that the designated wager may determine any component of the secondary game or bonus game played on the secondary display. For example, the bonus game played on the shared display may have a different; (i) paytable than the payables employed in the bonus games of the individual gaming machines; (ii) volatility than the volatility of bonus games of the individual gaming machine; (iii) average expected payback percentage than the average expected payback percentages of the bonus games of the individual gaming machines; (iv) eligibility for a progressive award than the individual gaming machines; (vi) modifier or multiplier than a multiplier employed by the individual gaming machines, (vii) type or kind of the bonus game than the bonus games of the individual gaming machines; or (viii) any combination of these.

It should be appreciated that the gaming system of the present invention may include any primary game operable upon a wager. In one embodiment, the gaming devices include the same primary game. In one embodiment, the gaming devices include different primary games. In one embodiment, each of the primary games is the same primary game with the same triggering event. In one embodiment, each of the gaming machines is associated with a different triggering event.

In one embodiment, a gaming system includes a plurality of gaming devices and includes a shared display or a shared multi-outcome symbol display that is positioned adjacent to each of the plurality of gaming devices. In one such embodiment, the shared display has a plurality of individual sections and symbols which represent the individual outcomes in the form of values displayed at each section. In one such embodiment, the gaming devices are positioned and spaced apart substantially equally about the perimeter of the shared display. The individual outcome or values on the wheel are fixed relative to each other.

In one embodiment, each gaming device includes at least one primary or base game operable upon a wager by a player.

In one embodiment, if a player places a designated wager, upon a triggering event, they are enabled to play the game on the shared multi-outcome display. The gaming device system activates the shared display (i.e., causes a wheel to spin) and simultaneously generates a separate or individual outcome associated with each of the gaming devices. In one embodiment, the separate outcomes are simultaneously generated or displayed to each player of each gaming device.

The outcomes can be the same for two or more of the gaming devices or can be different for two or more or each of the gaming devices. In one embodiment, the shared display generates and associates an individual outcome with each associated gaming device. Each gaming device that participates in the bonus event is provided the individual outcome associated with that gaming device. Each gaming device that does not participate in the bonus event is not provided the outcome associated with that gaming device.

It should be appreciated that the shared display may be any suitable display. In one embodiment, the shared display is mechanical. It should be appreciated that the shared display may be any suitable type of symbol generator including but not limited to a wheel, reels, dice or any other suitable display.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming system comprising:

a shared display device; and a gaming machine including:

(a) at least one processor;

(b) at least one display device;

(c) at least one input device; and (d) at least one memory device storing a plurality of instructions which, when executed by the at least one processor, cause the at least one processor to:

(i) cause the at least one display device to display a play of a primary game;

(ii) cause the at least one display device to display any awards associated with said play of the primary game; and (iii) if a bonus game triggering event occurs:

(A) if a shared display device qualifying condition is met:

(1) cause the shared display device to display a play of a first bonus game, and (2) cause the shared display device to display any awards associated with said play of the first bonus game; and (B) if the shared display device qualifying condition is not met:

(1) cause the at least one display device to display a play of a second bonus game, and (2) cause the at least one display device to display any awards associated with said play of the second bonus game.

2. The gaming system of claim 1, wherein the plurality of instructions, when executed by the at least one processor, cause the at least one processor to operate with the at least one input device to receive a wager from a player for said play of the primary game.

3. The gaming system of claim 2, wherein the shared display device qualifying condition is met when an amount of the received wager is at least the designated amount, and the shared display device qualifying condition is not met when the amount of the received wager is not at least the designated amount.

4. The gaming system of claim 1, wherein the plurality of instructions, when executed by the at least one processor, cause the at least one processor, if the bonus game triggering event occurs and the shared display device qualifying condition is not met, to cause the shared display device to not display said play of the second bonus game.

5. The gaming system of claim 1, wherein the plurality of instructions, when executed by the at least one processor, cause the at least one processor, if the bonus game triggering event occurs and the shared display device qualifying condition is met, to cause the at least one display device to display said play of the first bonus game.

6. The gaming system of claim 1, wherein the first bonus game and the second bonus game are the same.

7. The gaming system of claim 1, wherein the first bonus game is associated with a first paytable and the second bonus game is associated with a second different paytable.

8. The gaming system of claim 1, wherein an average expected payback percentage of the first bonus game is different than an average expected payback percentage of the second bonus game.

9. The gaming system of claim 8, wherein the average expected payback percentage of the first bonus game is greater than the average expected payback percentage of the second bonus game.

10. The gaming system of claim 1, wherein said play of the first bonus game results in a first outcome associated with a first award and said play of the second bonus game results in a second outcome associated with a second award.

11. The gaming system of claim 10, wherein when the first outcome and the second outcome are the same, the first award and the second award are different.

12. The gaming system of claim 11, wherein the first award is greater than the second award when the first outcome and the second outcome are the same.

13. The gaming system of claim 1, wherein said play of the first bonus game results in one of a first set of different outcomes and said play of the second bonus game results in one of a second different set of different outcomes.

14. A method of operating a gaming system, said method comprising:

(a) causing at least one processor to execute a plurality of instructions stored in at least one memory device to cause at least one display device of a gaming machine to display a play of a primary game;

(b) causing the at least one processor to execute the plurality of instructions to cause the at least one display device of the gaming machine to display any awards associated with said play of the primary game; and (c) if a bonus game triggering event occurs, causing the at least one processor to execute the plurality of instructions to:

(i) if a shared display device qualifying condition is met:

(A) cause a shared display device to display a play of a first bonus game, and (B) cause the shared display device to display any awards associated with said play of the first bonus game; and (ii) if the shared display device qualifying condition is not met:

(A) cause the at least one display device of the gaming machine to display a play of a second bonus game, and (B) cause the at least one display device of the gaming machine to display any awards associated with said play of the second bonus game.

15. The method of claim 14, which includes causing the at least one processor to execute the plurality of instructions to operate with at least one input device to receive a wager from a player for said play of the primary game.

16. The method of claim 15, wherein the shared display device qualifying condition is met when an amount of the received wager is at least the designated amount, and the shared display device qualifying condition is not met when the amount of the received wager is not at least the designated amount.

17. The method of claim 14, which includes causing the at least one processor to execute the plurality of instructions, if the bonus game triggering event occurs and the shared display device qualifying condition is not met, to cause the shared display device to not display said play of the second bonus game.

18. The method of claim 14, which includes causing the at least one processor to execute the plurality of instructions, if the bonus game triggering event occurs and the shared display device qualifying condition is met, to cause the at least one display device of the gaming machine to display said play of the first bonus game.

19. The method of claim 14, wherein the first bonus game and the second bonus game are the same.

20. The method of claim 14, wherein the first bonus game is associated with a first paytable and the second bonus game is associated with a second different paytable.

21. The method of claim 14, wherein an average expected payback percentage of the first bonus game is different than an average expected payback percentage of the second bonus game.

22. The method of claim 21 wherein the average expected payback percentage of the first bonus game is greater than the average expected payback percentage of the second bonus game.

23. The method of claim 14, wherein said play of the first bonus game results in a first outcome associated with a first award and said play of the second bonus game results in a second outcome associated with a second award.

24. The method of claim 23, when wherein the first outcome and the second outcome are the same, the first award and the second award are different.

25. The method of claim 24, wherein the first award is greater than the second award when the first outcome and the second outcome are the same.

26. The method of claim 14, wherein said play of the first bonus game results in one of a first set of different outcomes and said play of the second bonus game results in one of a second different set of different outcomes.

27. The method of claim 14, which is provided through a data network.

28. The method of claim 27, wherein the data network is an internet.

* * * * *

UNITED STATES PATENT AND TRADEMARK OFFICE

CERTIFICATE OF CORRECTION

PATENT NO. : 8,632,399 B2
APPLICATION NO. : 13/745492
DATED : January 21, 2014
INVENTOR(S) : Lance R. Peterson It is certified that error appears in the above-identified patent and that said Letters Patent is hereby corrected as shown below:

IN THE CLAIMS

In Claim 3, Column 20, Line 3, replace the second instance of "the" with --a--.
In Claim 16, Column 21, Line 13, replace the first instance of "the" with --a--.
In Claim 24, Column 22, Line 16, delete "when".
In Claim 24, Column 22, Line 16, between "wherein" and the second instance of "the" insert --when--.

Signed and Sealed this
Thirtieth Day of June, 2015

*Michelle K. Lee*

Michelle K. Lee
*Director of the United States Patent and Trademark Office*